United States Patent
Bortoli

(10) Patent No.: US 9,021,926 B2
(45) Date of Patent: May 5, 2015

(54) MULTIPLE TOOL DEVICE FOR PREPARING TUBULAR ELEMENTS TO BE WELDED BY ELECTROFUSION

(75) Inventor: Renzo Bortoli, Torreglia (IT)

(73) Assignee: Ritmo S.p.A., Teolo (Padua) (IT)

( * ) Notice: Subject to any disclaimer, the term of this patent is extended or adjusted under 35 U.S.C. 154(b) by 1077 days.

(21) Appl. No.: 13/065,581

(22) Filed: Mar. 24, 2011

(65) Prior Publication Data

US 2011/0232434 A1   Sep. 29, 2011

(30) Foreign Application Priority Data

Mar. 25, 2010   (IT) ................ VI2010A0086

(51) Int. Cl.
  *B23B 3/22*   (2006.01)
  *B23B 5/16*   (2006.01)
  *B23B 47/28*   (2006.01)

(52) U.S. Cl.
  CPC ............ *B23B 5/168* (2013.01); *B23B 5/167* (2013.01); *B23B 2215/72* (2013.01); *B23B 47/28* (2013.01); *Y10T 82/22* (2015.01); *Y10T 408/557* (2015.01); *B23B 2260/0482* (2013.01); *B23B 2260/12* (2013.01); *B23B 2260/138* (2013.01); *B23B 2265/08* (2013.01)

(58) Field of Classification Search
  CPC ............ B23B 5/167; B23B 5/16; B23B 5/168
  USPC .......... 82/113, 128, 130; 7/157, 158; 408/79, 408/80
  See application file for complete search history.

(56) References Cited

U.S. PATENT DOCUMENTS

| | | | | |
|---|---|---|---|---|
| 170,119 | A * | 11/1875 | Hull | 408/104 |
| 2,583,246 | A * | 1/1952 | Williams | 408/211 |
| 3,495,483 | A * | 2/1970 | Janik | 408/211 |
| 3,499,178 | A | 3/1970 | Blake | |
| 3,636,803 | A * | 1/1972 | Miller | 82/113 |
| 3,976,388 | A * | 8/1976 | Webb | 408/211 |
| 4,667,554 | A * | 5/1987 | Peery | 83/583 |
| 5,894,772 | A * | 4/1999 | Nodar | 82/113 |
| 6,993,848 | B2 * | 2/2006 | Snyder | 33/21.3 |
| 7,140,816 | B2 * | 11/2006 | Hall | 409/138 |
| 7,607,374 | B2 * | 10/2009 | Hall | 82/46 |
| 2002/0129684 | A1 | 9/2002 | Oswald | |

FOREIGN PATENT DOCUMENTS

DE     79 08 981     8/1979
DE     200 21 964     4/2001

(Continued)

OTHER PUBLICATIONS

Carvill J, "The Student Engineer's Companion", 1980, Butterworth & Co., Ltd, London, England ISBN 0 408 00438 X.

*Primary Examiner* — Daniel Howell
*Assistant Examiner* — Nicole N Ramos
(74) *Attorney, Agent, or Firm* — R Neil Sudol; Henry D. Coleman

(57) ABSTRACT

A multiple tool device, particularly adapted to prepare tubular elements to be welded by electrofusion, comprising a cup member which is associable with the end portion of a tubular element and is provided with motion transmission means adapted to turn the multiple tool device. The particularity of the present invention resides in that it comprises scraper means adapted to remove the outer surface layer of the end portion and facing means which have a working motion that is opposite with respect to the preceding means and are adapted to face the edge of the end portion so as to make it perpendicular to the axis of the tubular element.

11 Claims, 6 Drawing Sheets

(56) References Cited

FOREIGN PATENT DOCUMENTS

| DE | 102 33 862 | A1 | | 2/2004 |
| DE | 102007046631 | A1 | * | 2/2009 |
| EP | 1 118 405 | A1 | | 7/2001 |
| EP | 1787743 | A1 | * | 5/2007 |
| JP | 02243204 | A | * | 9/1990 |
| JP | 2007111775 | A | * | 5/2007 |

* cited by examiner

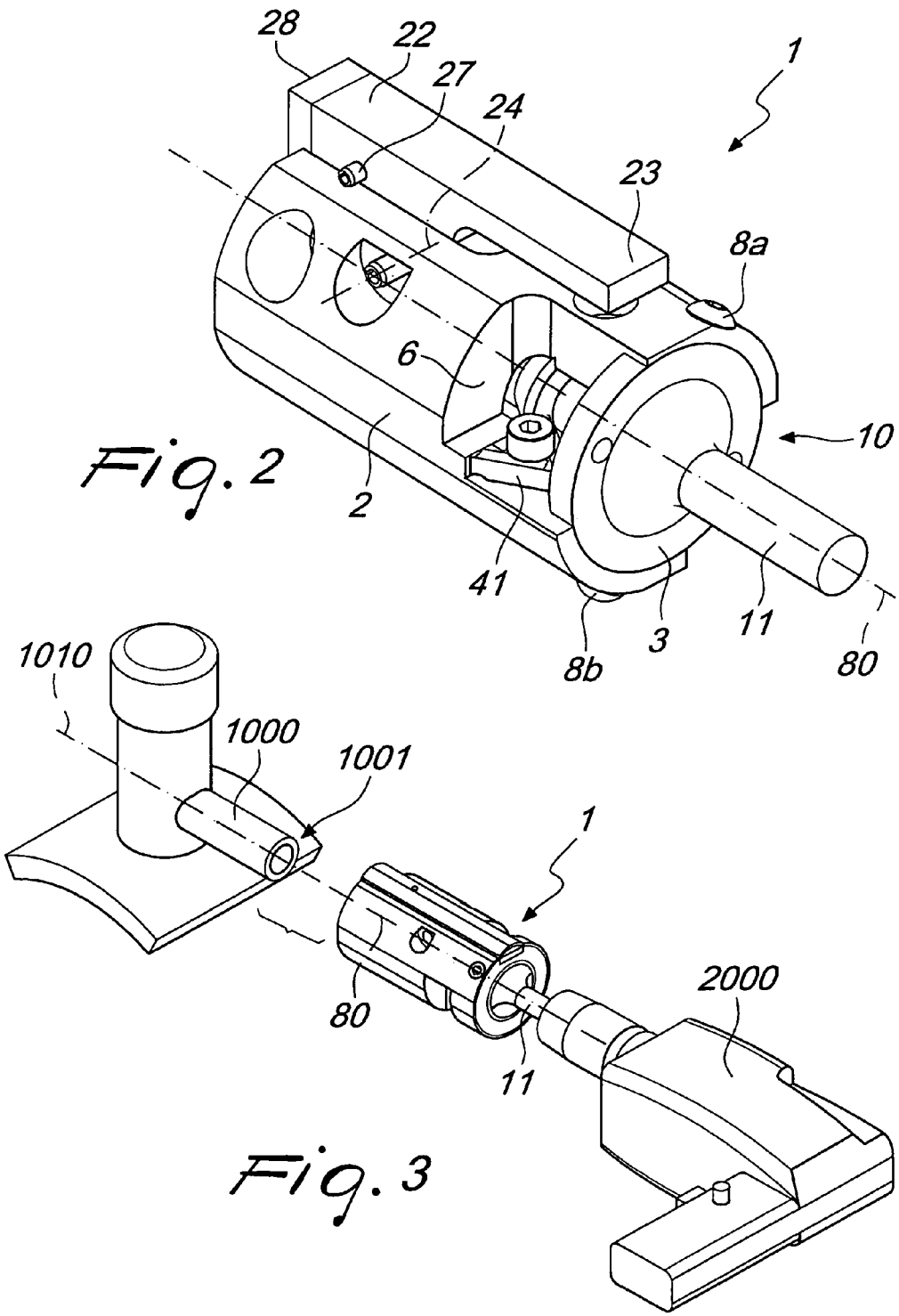

MULTIPLE TOOL DEVICE FOR PREPARING TUBULAR ELEMENTS TO BE WELDED BY ELECTROFUSION

The present invention relates to a multiple tool device, particularly adapted for preparing tubular elements to be welded by electrofusion.

As is known, systems composed of pipes and unions made of synthetic materials such as polyethylene or polypropylene are used increasingly by virtue of their high mechanical strength and long life even at high operating temperatures and pressures.

The connections between pipes and/or between a pipe and a union are provided generally by means of a process of welding by electrofusion, which is based on the fusing of the external surfaces of the pipes and/or unions and the internal surface of an electrically weldable element which incorporates an electric resistance heater.

The welding operation is performed by using energy dispensing devices which are controlled manually, semiautomatically or automatically and regulate the quantity of energy as a function of what is required by the electrical circuit inserted in the electrically weldable element.

The welds must be performed in a possibly dry place, sheltered from unfavorable atmospheric agents and by adopting adapted solutions.

In greater detail, the process of welding by electrofusion provides for a preparation step, which is essential for the successful provision of the joints, which consists in cutting and scraping the end of the tubular element to be welded.

Scraping is an operation that is indispensable for removing the surface layer of oxide that is present on the outer faces of pipes and unions. This intervention, performed directly before welding, must be performed uniformly, preferably affecting a region that is wider than the welding region.

In addition to what has been specified already, during the preparatory step it is also convenient to correct any ovalizations of the tubular elements, returning their dimensions within tolerated values, and to check the heads so that the ends to be welded are flat and perpendicular to their own axis.

The ends of pipes and unions are currently prepared by using specific equipment, which despite being used commonly is not free from drawbacks.

A first limitation shared by known devices is that each one is generally conceived to perform only one of the described operations. This forces operators to equip themselves with different instruments, which are specific for each operation, with a considerable economic expenditure.

Moreover, it should be noted that known devices are particularly difficult to use when the space available is limited, but this is unfortunately a situation that occurs often during the execution of repairs.

The aim of the invention is to solve the problems described above, providing a multiple tool device, particularly adapted for preparing tubular elements to be welded by electrofusion, that allows to perform all the operations prior to welding by electrofusion by using a single work tool.

Within the scope of this aim, a particular object of the invention is to provide a multiple tool device that allows to face, chamfer and scrape the end portion of pipes and/or unions to be welded by electrofusion.

Another object of the invention is to provide a multiple tool device that allows to perform these operations even in intervention situations with confined spaces.

A further object of the invention is to provide a multiple tool device that can work even on tubular elements having a small diameter.

Another object of the invention is to provide a multiple tool device that allows to prepare the ends of the pipes of load intakes.

Another object of the invention is to provide a multiple tool device that can be used to repair lines that have already been installed.

This aim, these objects and others that will become better apparent hereinafter are achieved by a multiple tool device, particularly adapted to prepare tubular elements to be welded by electrofusion, comprising a cup member which is associable with the end portion of a tubular element; said cup member comprises motion transmission means adapted to turn said multiple tool device; said multiple tool device is characterized in that it comprises scraper means adapted to remove the outer surface layer of said end portion and facing means adapted to face the edge of said end portion in order to make it perpendicular to the axis of said tubular element; the operating motion of said scraper means is opposite to the operating motion of said facing means.

Further characteristics and advantages will become better apparent from the description of preferred but not exclusive embodiments of a multiple tool device according to the invention, illustrated by way of non-limiting example in the accompanying drawings, wherein:

FIG. 2 is a perspective view of the multiple tool device of the preceding figure;

FIG. 3 is a perspective view of a multiple tool device according to the invention, applied to a drill/power screwdriver, and of a first tubular element to be prepared for welding;

Figure 1:
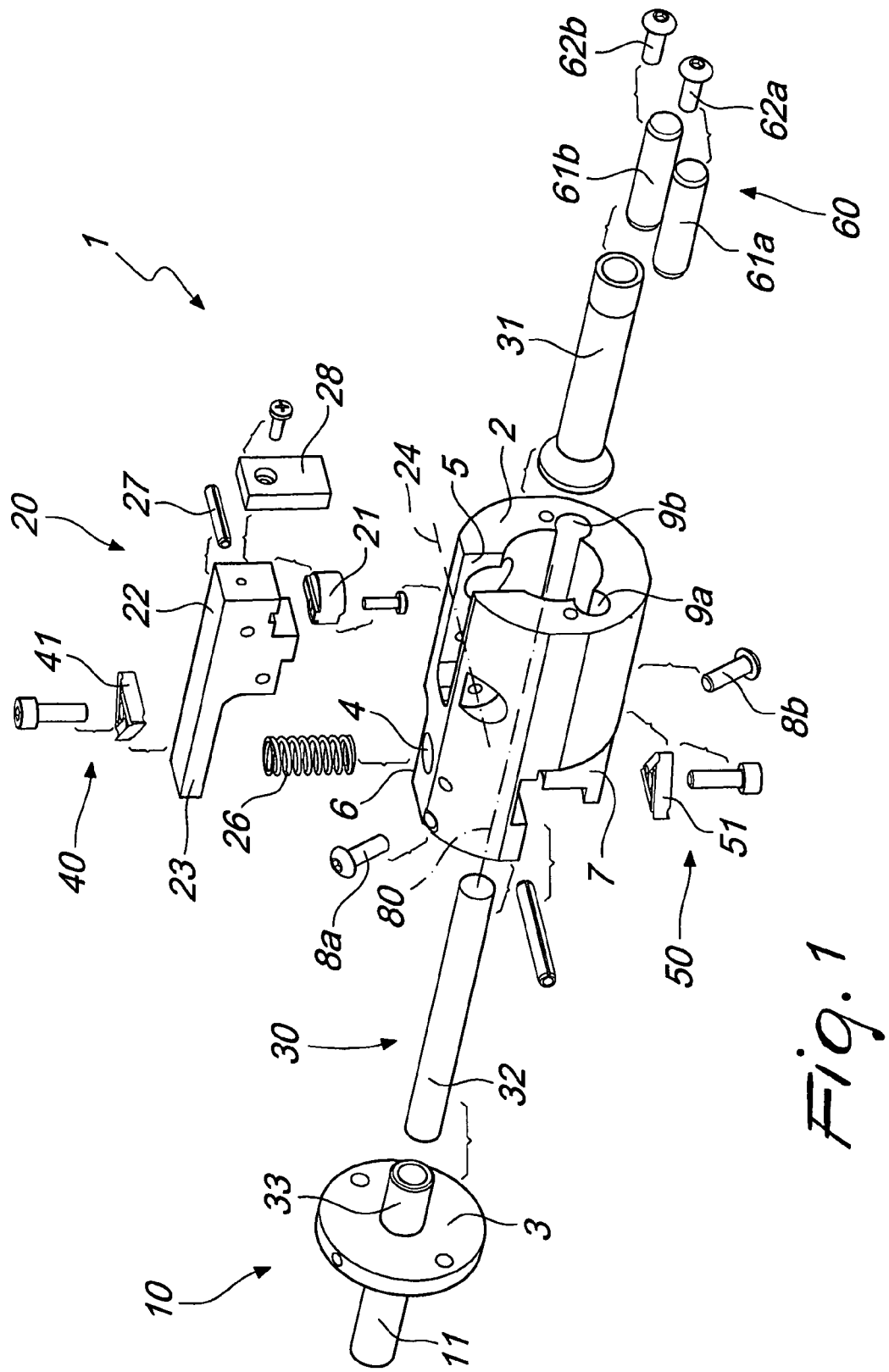
FIG. 1 is an exploded perspective view of a multiple tool device according to the invention.

With reference to the cited FIGS. 1 to 6, a multiple tool device, particularly adapted for preparing tubular elements to be welded by electrofusion, is generally designated by the reference numeral 1.

The multiple tool device 1 comprises a cup member 2, which is provided so as to accommodate the end portion 1001 of a tubular element 1000, which is constituted for example by a pipe or a union made of a synthetic material that can be welded by heating.

The cup member 2 is preferably made of metallic material and comprises motion transmission means 10 which are designed to turn the multiple tool device 1 during the operations for preparing the tubular element 1000.

In detail, the motion transmission means 10 are constituted advantageously by a shank 11, which protrudes from the outer face of the base 3 of the cup member 2 and is extended coaxially to the longitudinal axis 80 of the latter.

The shank 11 can be fixed to the spindle of an electric tool constituted by a drill/power screwdriver 2000 or by any other substantially equivalent instrument known to the person skilled in the art.

The base 3 can be provided monolithically with the cup member 2 or, more advantageously, joined detachably to the latter by virtue of screws 8a and 8b.

In an optional constructive variation, not shown in the accompanying figures, it is possible to associate with the shank 11 a constant-speed transmission adapted to divert the rotation axis of the drill/power screwdriver 2000 with respect to the rotation axis of the multiple tool device 1.

The presence of the constant-speed joint might be particularly advantageous when the work spaces are confined or when it is not possible to align the drill/power screwdriver 2000 with the tubular element 1000.

In another constructive variation, not shown in the accompanying figures, the motion transmission means 10 might even be reduced to a knurling provided on the outer surface of the cup member 2 so as to facilitate the manual rotation of said member.

According to the invention, the multiple tool device 1 comprises scraper means 20, which are designed to remove the outer surface layer of the end portion 1001, and facing means 40, which are meant to flatten the edge of the end portion 1001 so as to make it perpendicular to the longitudinal axis 1010 of the tubular element 1000.

It is important to consider that the scraper means 20 have a working motion which is opposite with respect to the facing means 40, i.e., while the former work when the multiple tool device 1 rotates counterclockwise, the latter work when the multiple tool device 1 rotates clockwise, or vice versa.

During the scraping operations, instead, the countersunk head member 31 is initially fully screwed onto the threaded bar 32 but does not rest against the base 3 by virtue of the presence of a stop element 33 against which it abuts. Therefore, in this case the second tool 41 cannot interact with the tubular element 1000.

The second arm 23 of the rocker lever is pushed by elastic means, which abut against the cup member 2 and are constituted essentially by a spring 26 which is inserted in an adapted receptacle 4.

The first arm 2 oscillates in a slit 5, which is provided in the lateral surface of the cup member 2 so that the cutting edge of the first tool 21 protrudes from the internal surface of the latter.

The cutting edge of the first tool 21 is oriented so as to be parallel to the longitudinal axis 80 and its maximum protrusion is fixed by a pin 27 inserted transversely in the first arm 22 in order to limit the oscillations of the latter, abutting against the outer lateral surface of the cup member 2.

It should also be noted that a shoe 28 is fixed substantially at the free end of the first arm 22 and is designed to ensure a constant cutting depth of the first tool 21 during its advancement.

The shoe 28, by abutting against the outer surface of the tubular element 1000, in fact prevents the first tool 21 from sinking during the scraping operations and ensures a uniform removal of surface material.

The advancement motion is imparted to the first tool 21 by an advancement device 30, which is essentially composed of a countersunk head member 31 and a threaded bar 32 which is accommodated within the cup member 2 at the longitudinal axis 80 of the latter.

During the scraping operation, the countersunk head member 31 is mated with the threaded bar 32 and is inserted within the tubular element 1000. The frustum-like shape of the head ensures both that the multiple tool device 1 is centered with respect to the tubular element 1000 and that the countersunk head member 31 interferes mechanically with the tubular element 1000.

Going back to the facing means, they are constituted by a second tool 41 of the interchangeable type, which is fixed to the cup member 2 substantially at the base 3.

The second tool 41 is accommodated in a first seat 6, which is formed so that during the facing operations the cutting edge of said tool protrudes from the internal face of the base 3 and is oriented at right angles to the longitudinal axis 80.

In this regard, it should be noted that during the facing operations the countersunk head member 31 is removed from the threaded bar 32 and accordingly the tubular element 1000 can enter fully the cup member 2 until it rests against the base 3 so as to interact with the second tool 41.

During the scraping operations, instead, the countersunk head member 31 is initially fully screwed onto the threaded bar 32 but does not rest against the base 3 by virtue of the presence of a stop element 32 against which it abuts. Therefore, in this case the second tool 41 cannot interact with the tubular element 1000.

The described multiple tool device 1 is advantageously equipped also with chamfering means 50, which are adapted to remove the corner that corresponds to the edge of the end portion 1001.

The working motion of the chamfering means 50 matches the motion of the facing means 40, simultaneously with which they are designed to act.

The chamfering means 50 are formed by a third tool 51, of the interchangeable type, which is fixed to the cup member 2 substantially at the base 3.

The third tool 51 is accommodated in a second seat 7 which is defined so that during chamfering the cutting edge of said tool protrudes from the internal face of the base 3 and is oriented transversely to the longitudinal axis 80.

Typically, the chosen orientation angle is substantially equivalent to 45°.

The same remarks made for the second tool 41 apply also to the third tool 51, i.e., it, too, does not interact with the tubular element 1000 during the scraping operations.

Coaxiality between the multiple tool device 1 and the tubular element 1000 is ensured by centering means 60, which are formed by a pair of cylindrical elements 61a and 61b which are inserted detachably in a pair of receptacles 9a and 9b and are fixed by means of screws 62a and 62b.

The receptacles 9a and 9b are provided on the internal surface of the cup member 2 at an adapted distance from each other and have a shape that is substantially complementary to the shape of the cylindrical elements 61a and 61b.

Figure 7:
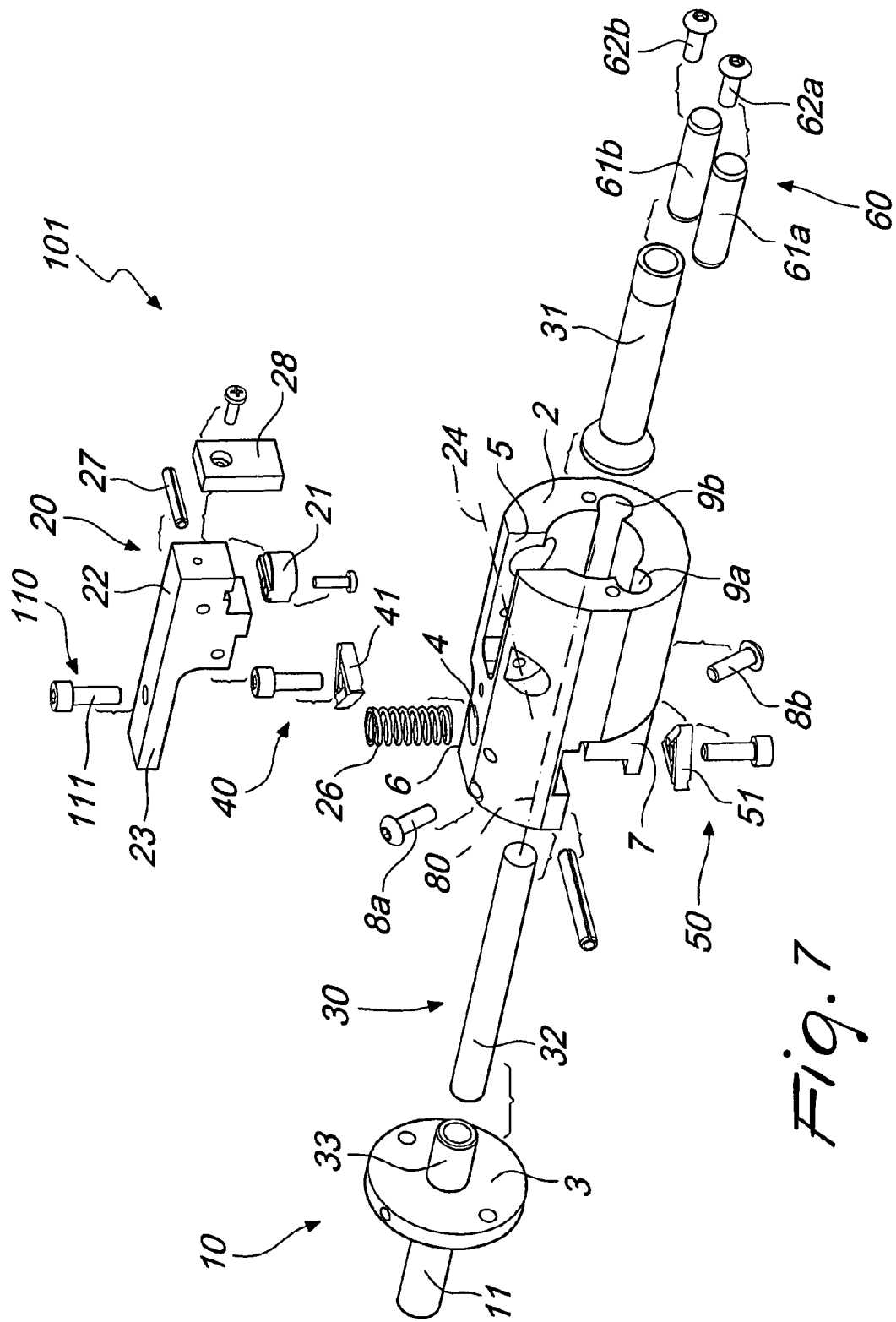
FIG. 7 is an exploded perspective view of a constructive variation of a multiple tool device according to the invention.
Figure 8:
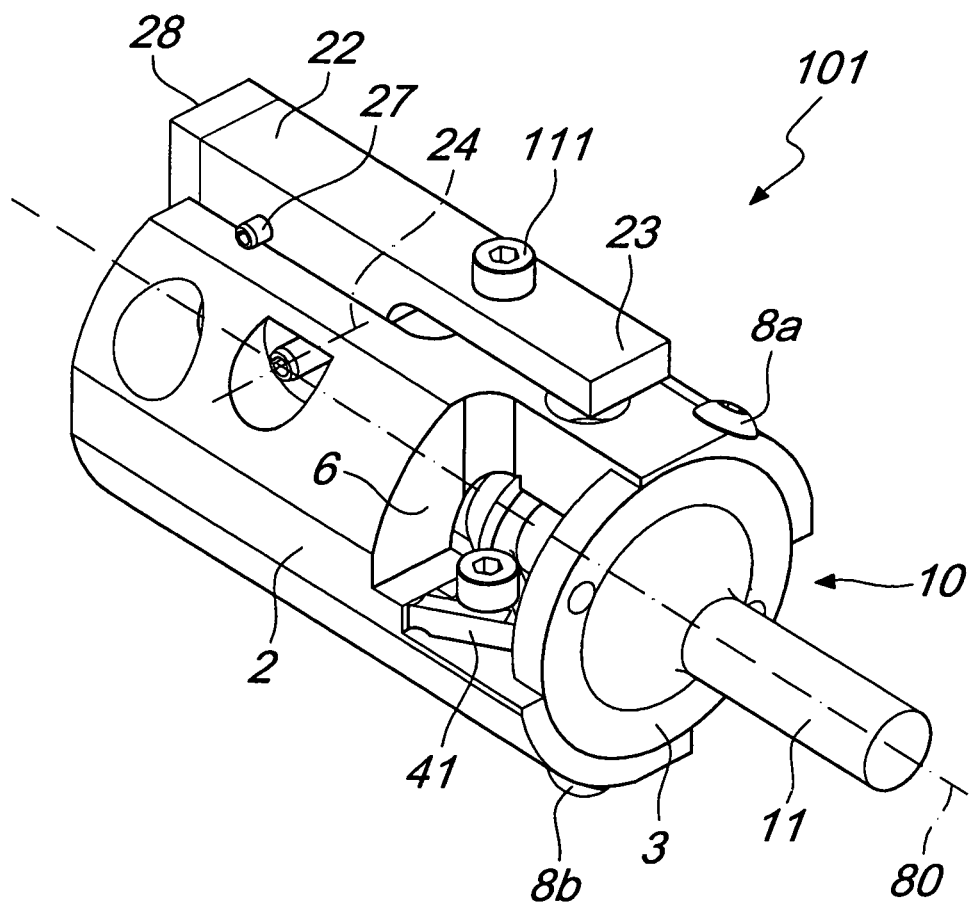
FIG. 8 is a perspective view of the multiple tool device of the preceding figure.

In a constructive variation, shown in FIGS. 7 and 8, the multiple tool device according to the invention is generally designated by the reference numeral 101.

The multiple tool device 101 is provided with locking means 110, which allow to lock the oscillation of the first arm 22 and accordingly to use the device as a calibration unit.

The locking means 110 are constituted by a threaded element 111, advantageously constituted by a screw, which engages a corresponding female thread provided on the second arm 23.

The threaded element 111, by abutting against the outer lateral surface of the cup member 2, locks the rocker lever and fixes the cutting depth of the first tool 21.

For the constructive variation shown in FIGS. 7 and 8, the elements that correspond to the elements that have already been described with reference to the embodiment shown in FIGS. 1 to 6 have been designated by the same reference numerals.

The operation of the device according to the invention is as follows.

First of all, the shank 11 of a multiple tool device 1 or 101 is fixed to the spindle of a drill/power screwdriver 2000 and then the countersunk head member 31 is unscrewed from the threaded bar 32 until it is removed.

At this point it is possible to prepare a tubular element 1000, beginning advantageously with the facing and chamfering of its end portion 1001, i.e., respectively facing its edge so as to make it perpendicular to the longitudinal axis 1010 and simultaneously removing its corner.

In greater detail, the end portion 1001 is inserted within the cup member 2 until its edge abuts against the base 3, and then, by means of the drill/power screwdriver 2000, the multiple tool device 1 or 101 is turned so that the second tool 41 and the third tool 51 can remove the excess material from the tubular element 1000.

As anticipated, the facing means 40 and the chamfering means 50 have a working motion which is opposite with respect to the scraper means 20; therefore, while the second tool 41 and the third tool 51 interact with the tubular element 1000, the first tool 21 applies no action.

When the facing and chamfering operations have ended, the tubular element 1000 is extracted from the cup member 2 and the countersunk head member 31 is screwed fully onto the threaded bar 32.

One then proceeds by inserting again the tubular element 1000 in the cup member 2 and simultaneously inserting the countersunk head member 31 within said tubular element 1000 until the frustum-shaped portion of the former does not interfere mechanically with the edge of the latter.

This solution allows to keep the countersunk head member 31 stationary with respect to the threaded bar 32 during the rotations of the multiple tool device 1 or 101.

Moreover, the frustum-shaped portion of the countersunk head member 31, together with the centering means 60, ensures coaxiality between the multiple tool device 1 and the tubular element 1000.

After reversing the direction of rotation of the drill/power screwdriver 2000 with respect to the direction used during the facing and chamfering operations, the multiple tool device 1 or 101 is rotated again.

As a consequence of these rotations, the first tool 21 bites into the end portion 1001, removing its outer surface layer; simultaneously, the countersunk head member at 31 unscrews progressively from the threaded bar 32. This provides the advancement motion to the first tool 21, i.e., makes it move with respect to the tubular element 1000 with a spiral trajectory, so that new surfaces to be worked are always brought into contact with said tool.

In the case of the multiple tool device 1, any slight ovalizations of the end portion 1001 are compensated by the oscillations of the rocker lever, which modify the protrusion of the first tool 21 from the internal surface of the cup member 2.

In the case of the multiple tool device 101, the rocker lever is instead fixed and the first tool 21 protrudes to a constant extent from the internal surface of the cup member 2. This configuration therefore allows to reduce to the desired diameter the end portion 1001 of the tubular element 1000.

Figure 4:
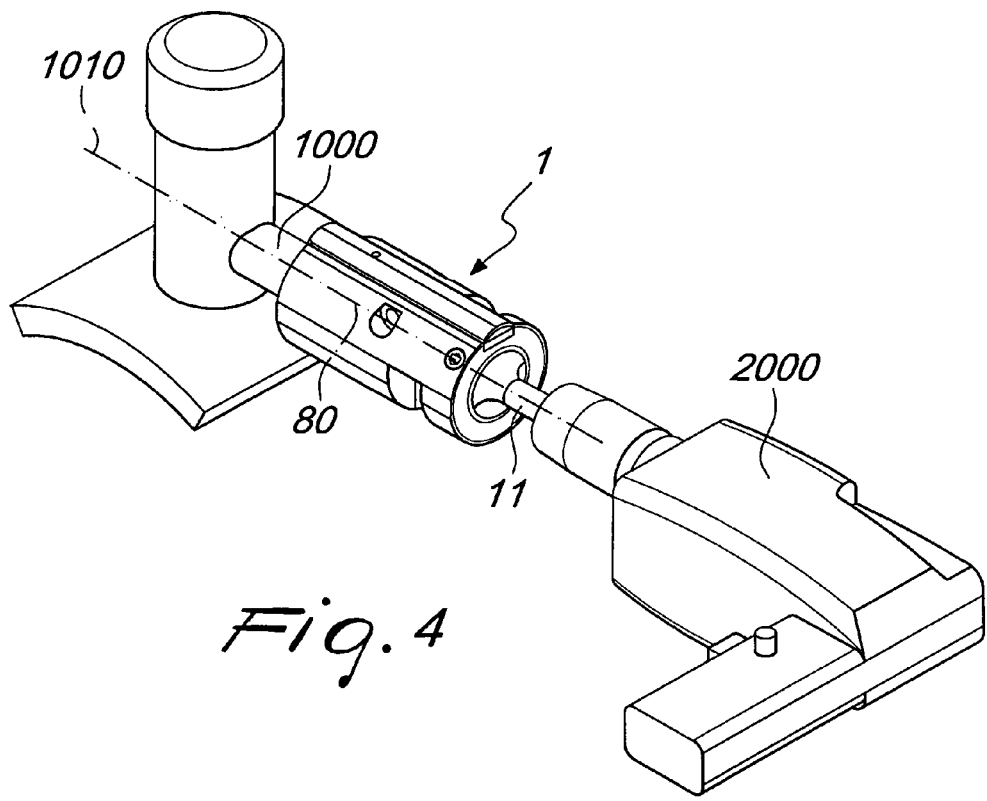
FIG. 4 is a perspective view of a multiple tool device according to the invention, applied to a drill/power screwdriver, during the preparation of the first tubular element.
Figure 5:
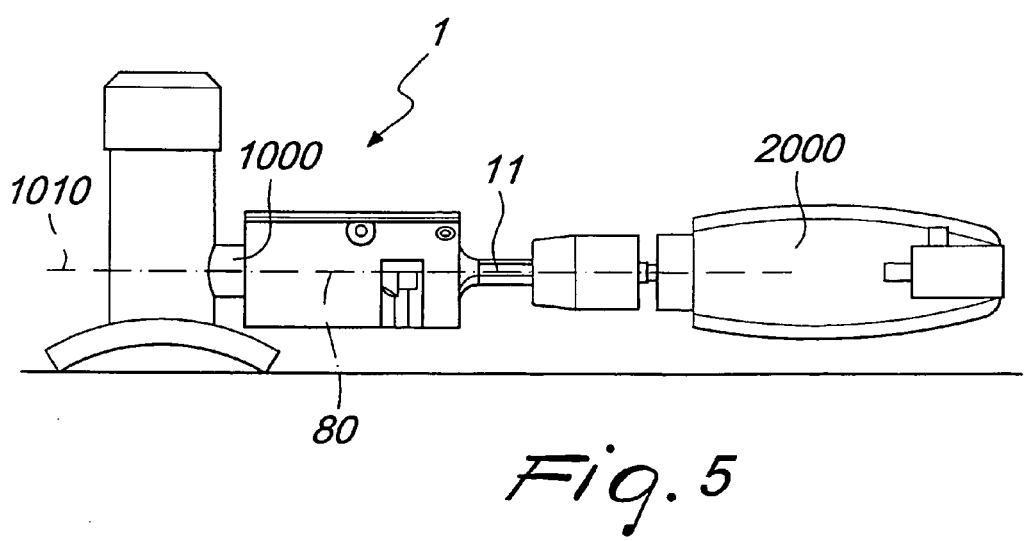
FIG. 5 is a side view of a multiple tool device according to the invention, applied to a drill/power screwdriver, during the preparation of the first tubular element.
Figure 6:
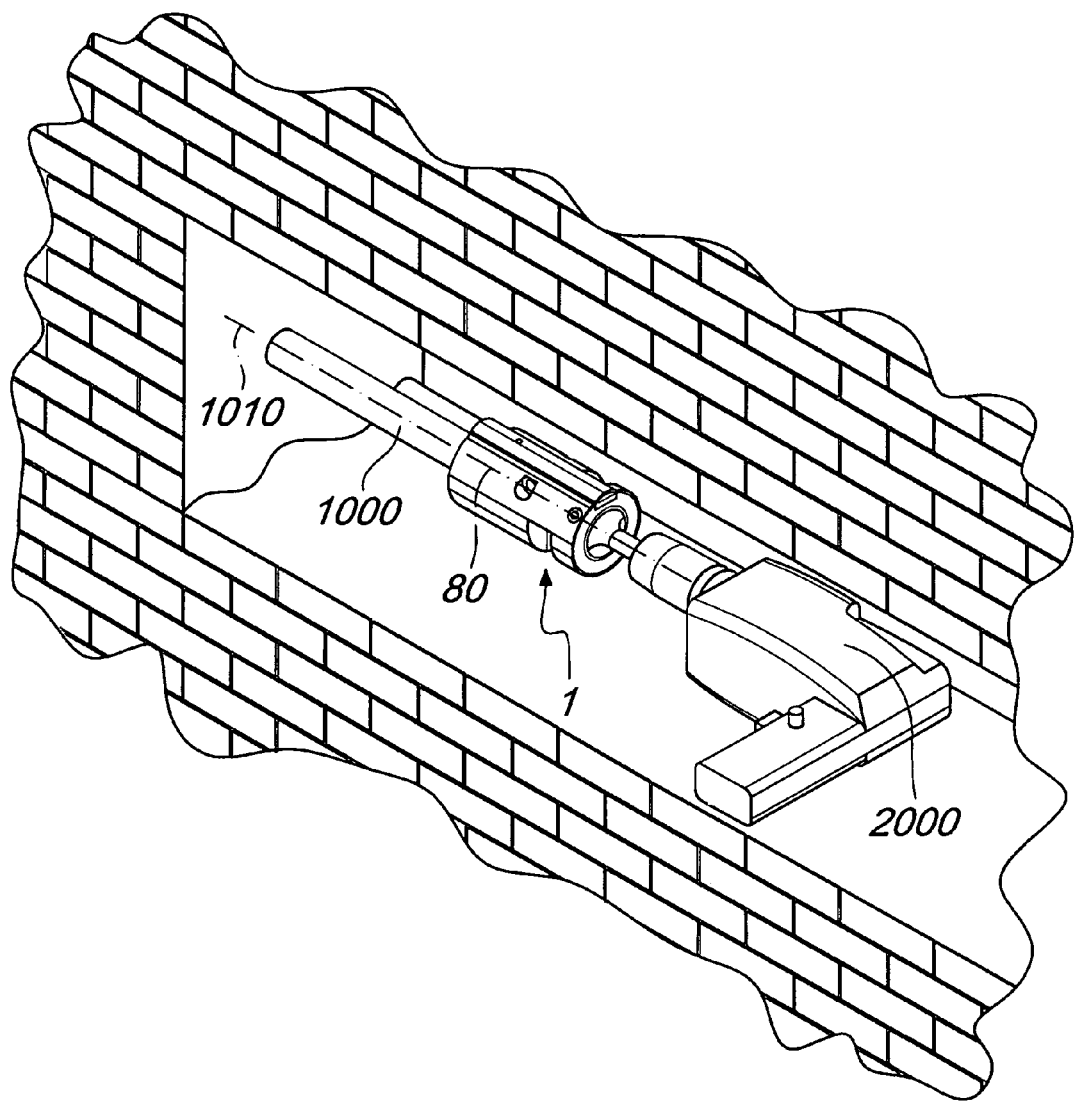
FIG. 6 is a perspective view of multiple tool device according to the invention, applied to a drill/power screwdriver during the preparation of a second tubular element.

It is important to note that the facing, chamfering and scraping operations described above can be performed by using the multiple tool device 1 or 101 even when the space available is limited, such as during the preparation of the ends of the pipes of load intakes, shown in the accompanying FIGS. 3 to 5, or the repair of lines that have already been installed, shown in FIG. 6.

In practice it has been found that the multiple tool device, particularly adapted to prepare tubular elements to be welded by electrofusion, according to the invention, fully achieves the intended aim, since it allows to face, chamfer and scrape the end portion of pipes and/or unions by using a single work tool.

Moreover, the multiple tool device according to the invention allows to perform these operations even in intervention situations in which the space available is limited and accordingly can be used both to prepare the ends of the pipes of the load intakes and to repair ducts that have already been installed.

It should also be noted that the multiple tool device according to the invention is able to work even on tubular elements having a small diameter, such as for example those with a diameter that can vary between 20 and 63 mm.

The multiple tool device thus conceived is susceptible of numerous modifications and variations, all of which are within the scope of the inventive concept; all the details may furthermore be replaced with other technically equivalent elements.

In practice, the materials used, so long as they are compatible with the specific use, as well as the contingent shapes and dimensions, may be any according to the requirements and the state of the art.

This application claims the priority of Italian Patent Application No. VI2010A000086, filed on Mar. 25, 2010, the subject matter of which is incorporated herein by reference.

The invention claimed is:

1. A multiple tool device, for preparing tubular elements to be welded by electrofusion, comprising:
   a cup member which is associable with an end portion of a tubular element;
   a motion transmission element for use in turning or rotating said multiple tool device;
   a scraper configured to remove an outer surface layer of said end portion; and
   a facing member adapted to face an edge of said end portion in order to render said edge perpendicular to a longitudinal axis of said tubular element, said scraper having an operating motion in one direction and said facing member having an operating motion in an opposite direction,
   said scraper comprising at least one first tool, said facing member comprising a second tool, said second tool being fixed to said cup member at a base thereof, said second tool having a cutting edge that protrudes from an internal surface of said base at right angles to a longitudinal axis of said cup member, wherein:
   said at least one first tool is fixed to a first arm of a rocker lever which is articulated to said cup member, said rocker lever having an articulation or pivot axis that is transverse to the longitudinal axis of said cup member, further comprising an elastic or spring element that pushes a second arm of said rocker lever and that abuts against said cup member;
   said first arm oscillates inside a slit that is formed in a side wall of said cup member;
   a cutting edge of said at least one first tool protrudes from the internal surface of said cup member, parallel to the longitudinal axis of said cup member;
   the oscillation of said first arm is limited by at least one pin associated transversely with said first arm and abutting against an outer lateral surface of said cup member; and
   said rocker lever is provided with a locking component adapted to lock the oscillation of said first arm, said locking component comprising at least one threaded element which engages a corresponding female thread provided in said second arm, said threaded element abutting against an outer lateral surface of said cup member.

2. A multiple tool device, for preparing tubular elements to be welded by electrofusion, comprising:
- a cup member which is associable with an end portion of a tubular element;
- a motion transmission element for use in turning or rotating said multiple tool device;
- a scraper configured to remove an outer surface layer of said end portion; and
- a facing member adapted to face an edge of said end portion in order to render said edge perpendicular to a longitudinal axis of said tubular element, said scraper having an operating motion in one direction and said facing member having an operating motion in an opposite direction,
- said scraper comprising at least one first tool, said facing member comprising a second tool, said second tool being fixed to said cup member at a base thereof, said second tool having a cutting edge that protrudes from an internal surface of said base at right angles to a longitudinal axis of said cup member, wherein:
- said at least one first tool is fixed to a first arm of a rocker lever which is articulated to said cup member, said rocker lever having an articulation or pivot axis that is transverse to the longitudinal axis of said cup member, further comprising an elastic or spring element that pushes a second arm of said rocker lever and that abuts against said cup member; and
- said rocker lever is provided with at least one shoe adapted to limit a cutting depth of said at least one first tool during a forward motion, said at least one shoe being fixed to an end of said first arm and abutting against an outer surface of said tubular element during scraping operations.

3. A multiple tool device, for preparing tubular elements to be welded by electrofusion, comprising:
- a cup member which is associable with an end portion of a tubular element;
- a motion transmission element for use in turning or rotating said multiple tool device;
- a scraper configured to remove an outer surface layer of said end portion; and
- a facing member adapted to face an edge of said end portion in order to render said edge perpendicular to a longitudinal axis of said tubular element, said scraper having an operating motion in one direction and said facing member having an operating motion in an opposite direction,
- said scraper comprising at least one first tool, said facing member comprising a second tool, said second tool being fixed to said cup member at a base thereof, said second tool having a cutting edge that protrudes from an internal surface of said base at right angles to a longitudinal axis of said cup member, wherein:
- said at least one first tool is fixed to a first arm of a rocker lever which is articulated to said cup member, said rocker lever having an articulation or pivot axis that is transverse to the longitudinal axis of said cup member, further comprising an elastic or spring element that pushes a second arm of said rocker lever and that abuts against said cup member;
- said scraper comprises an advancement device adapted to impart an advancement motion to said at least one first tool;
- said advancement device comprises a countersunk head element, which is mated with a threaded bar accommodated within said cup member;
- said threaded bar protrudes from the base of said cup member in a substantially central position;
- said countersunk head element is inserted within said tubular element during said scraping operations; and
- said second tool does not interact with said tubular element when said countersunk head element is completely screwed onto said threaded bar.

4. A multiple tool device, for preparing tubular elements to be welded by electrofusion, comprising:
- a cup member which is associable with an end portion of a tubular element;
- a motion transmission element for use in turning or rotating said multiple tool device;
- a scraper configured to remove an outer surface layer of said end portion; and
- a facing member adapted to face an edge of said end portion in order to render said edge perpendicular to a longitudinal axis of said tubular element, said scraper having an operating motion in one direction and said facing member having an operating motion in an opposite direction,
- said scraper comprising at least one first tool, said facing member comprising a second tool, said second tool being fixed to said cup member at a base thereof, said second tool having a cutting edge that protrudes from an internal surface of said base at right angles to a longitudinal axis of said cup member,
- further comprising chamfering means for removing the edge from, or beveling the edge of, said end portion.

5. The multiple tool device according to claim 4 wherein said chamfering means comprises at least one additional tool, fixed to said cup member substantially at said base, a cutting edge of said additional tool protruding from said internal surface of said base transversely to the longitudinal axis of said cup member.

6. The multiple tool device according to claim 5 wherein said additional tool does not interact with said tubular element when said countersunk head element is completely screwed onto said threaded bar.

7. A multiple tool device, for preparing tubular elements to be welded by electrofusion, comprising:
- a cup member which is associable with an end portion of a tubular element;
- a motion transmission element for use in turning or rotating said multiple tool device;
- a scraper configured to remove an outer surface layer of said end portion;
- a facing member adapted to face an edge of said end portion in order to render said edge perpendicular to a longitudinal axis of said tubular element, said scraper having an operating motion in one direction and said facing member having an operating motion in an opposite direction; and
- centering means adapted to maintain coaxiality between said multiple tool device and said tubular element, said centering means comprising at least one pair of removable cylindrical elements inserted in a pair of receptacles provided on an internal surface of said cup member.

8. The multiple tool device according to claim 7 wherein said motion transmission element comprises a shank which protrudes from an outer face of said base of said cup member in a substantially central position, said shank being configured for fixation to a tool adapted to turn said multiple tool device.

9. A multiple tool device, for preparing tubular elements to be welded by electrofusion, comprising:
- a cup member which is associable with an end portion of a tubular element;
- a motion transmission element for use in turning or rotating said multiple tool device;
- a scraper configured to remove an outer surface layer of said end portion;
- a facing member adapted to face an edge of said end portion in order to render said edge perpendicular to a longitudinal axis of said tubular element, said scraper having an operating motion in one direction and said facing member having an operating motion in an opposite direction; and
- a rocker lever articulated to said cup member, said rocker lever having articulation axis transverse to the longitudinal axis of said cup member, said rocket lever having a first arm and a second arm, said scraper including at least one first tool fixed to said first arm, said rocker lever having at least one shoe adapted to limit a cutting depth of said at least one first tool during a forward motion, said shoe being fixed to an end of said first arm and abutting against an outer surface of said tubular element during scraping operations.

10. The multiple tool device according to claim 9 wherein:
- said first arm oscillates inside a slit that is formed in a side wall of said cup member;
- said rocker lever is provided with a locking component adapted to lock the oscillation of said first arm;
- said locking component comprises at least one threaded element which engages a corresponding female thread provided in said second arm; and
- said threaded element abuts against an outer lateral surface of said cup member.

11. The multiple tool device according to claim 9, further comprising an elastic or spring element that pushes said second arm of said rocker lever and that abuts against said cup member.

* * * * *